United States Patent
Pupala et al.

(10) Patent No.: US 9,094,157 B2
(45) Date of Patent: Jul. 28, 2015

(54) METHODS AND DEVICES FOR COOPERATIVE SCHEDULING IN A WIRELESS COMMUNICATIONS NETWORK

(71) Applicants: Rahul Pupala, Piscataway, NJ (US); Satish Kanugovi, Bangalore (IN); Subramanian Vasudevan, Morristown, NJ (US)

(72) Inventors: Rahul Pupala, Piscataway, NJ (US); Satish Kanugovi, Bangalore (IN); Subramanian Vasudevan, Morristown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 123 days.

(21) Appl. No.: 13/861,445

(22) Filed: Apr. 12, 2013

(65) Prior Publication Data

US 2014/0307637 A1 Oct. 16, 2014

(51) Int. Cl.
H04B 7/00 (2006.01)
H04L 5/00 (2006.01)
H04W 72/12 (2009.01)
H04W 92/20 (2009.01)

(52) U.S. Cl.
CPC ......... *H04L 5/0035* (2013.01); *H04W 72/1257* (2013.01); *H04W 92/20* (2013.01)

(58) Field of Classification Search
CPC ........ H04W 4/023; H04W 4/025; H04W 4/08
USPC .......... 370/310, 328, 329, 338, 431, 464, 465
See application file for complete search history.

(56) References Cited

U.S. PATENT DOCUMENTS

| | | | | |
|---|---|---|---|---|
| 8,774,800 | B2 * | 7/2014 | Acharya | 455/434 |
| 8,855,068 | B2 * | 10/2014 | Qin et al. | 370/329 |
| 2010/0130219 | A1 * | 5/2010 | Cave et al. | 455/450 |
| 2010/0177746 | A1 * | 7/2010 | Gorokhov et al. | 370/336 |
| 2010/0284345 | A1 | 11/2010 | Rudrapatna et al. | |
| 2010/0284346 | A1 | 11/2010 | Rudrapatna et al. | |
| 2011/0287798 | A1 * | 11/2011 | Ono et al. | 455/509 |
| 2013/0315156 | A1 * | 11/2013 | Xiao et al. | 370/329 |

FOREIGN PATENT DOCUMENTS

EP 1760954 A1 3/2007

OTHER PUBLICATIONS

Zhou et al. "Global Proportional Fair Scheduling for Networks with Multiple Base Stations," *IEEE Transactions on Vehicular Technology*, 60(4), May 1, 2011.

(Continued)

*Primary Examiner* — Dmitry H Levitan
(74) *Attorney, Agent, or Firm* — Harness, Dickey & Pierce, P.L.C.

(57) ABSTRACT

A method of multi-streaming data includes obtaining first information based on transmission conditions between a first base station and a first set of users associated with the first base station. The method may include obtaining second information based on transmission conditions between a second base station and a second set of users associated with the second base station. The method may also include calculating metrics for the first set of users based on the first and second information. The first set users may include a subset of users that are associated with the first and second base station. The method may further include selecting a user from among the first set of users based on the calculated metrics.

20 Claims, 4 Drawing Sheets

(56) References Cited

OTHER PUBLICATIONS

Abou-Zeid et al. "Long-term Proportional Fairness over Multiple Cells," *Local Computer Networks Workshops*, IEEE 37th Conference, Oct. 22, 2012.

International Search Report (PCT/ISA/210) dated Jul. 2, 2014 for corresponding International Application No. PCT/US2014/033418.
Written Opinion of the International Searching Authority (PCT/ISA/237) dated Jul. 2, 2014 for corresponding International Application No. PCT/US2014/033418.

* cited by examiner

METHODS AND DEVICES FOR COOPERATIVE SCHEDULING IN A WIRELESS COMMUNICATIONS NETWORK

BACKGROUND

1. Field

At least one example embodiment relates to methods and/or devices for scheduling transmission of data to users in a wireless network.

2. Description of Related Art

In a wireless communications network, multi-streaming is a configuration in which multiple base stations transmit independent streams of data to users. Co-operative scheduling schemes are used to balance network level fairness in multi-streaming. In conventional co-operative scheduling schemes, average throughput information for each user is shared between individual base stations. Each participating base station incorporates the shared average throughput information into a cooperative scheduling algorithm that determines the order in which users will receive data from a particular base station.

SUMMARY

At least one example embodiment relates to methods and/or devices for scheduling transmission of data to users in a wireless communications network.

According to at least one example embodiment, a method of multi-streaming data includes obtaining first information based on transmission conditions between a first base station and a first set of users associated with the first base station. The method may include obtaining second information based on transmission conditions between a second base station and a second set of users associated with the second base station. The method may also include calculating metrics for the first set of users based on the first and second information, the first set users including a subset of users that are associated with the first and second base station. The method may further include selecting a user from among the first set of users based on the calculated metrics.

According to at least one example embodiment, the method may further include transmitting a first message such that the data is sent to the selected user. The method may also include transmitting a second message such that the first information is sent to the second base station.

According to at least one example embodiment, the selecting the user includes selecting the user having a largest calculated metric.

According to at least one example embodiment, the calculating the metrics includes calculating the metrics for the subset of users based on the first and second information, average throughputs received by the subset of users from the first base station, and average throughputs received by the subset of users from the second base station.

According to at least one example embodiment, the calculating the metrics includes calculating the metrics for the subset of users based on the first and second information, estimated instantaneous throughputs to be received by the subset of users from the first base station, and estimated instantaneous throughputs to be received by the subset of users from the second base station.

According to at least one example embodiment, the first information is sent to the second base station via at least one of a backhaul and an air interface.

According to at least one example embodiment, the information is based on at least one of a throughput delivered to the first set of users by the first base station, a load at the first base station, a signal to noise ratio ensemble for the first set of users with respect to the first base station, an energy cost per bit for the first set of users with respect to the first base station, and an operator policy with respect to the first base station. The second information is based on at least one of a throughput delivered to the second set of users by the second base station, a load at the second base station, a signal to noise ratio ensemble for the second set of users with respect to the second base station, an energy cost per bit for the second set of users with respect to the second base station, and an operator policy with respect to the second base station.

According to at least one example embodiment, the method may further include obtaining third information based on transmission conditions between a third base station and a third set of users associated with the third base station. At least one user in the subset is also associated with the third base station. The calculating the metrics for the first set of users includes calculating the metrics based on the first, second, and third information.

According to at least one example embodiment, the metrics for the subset of users are further based on average throughputs received by the subset of users from the first base station, average throughputs received by the subset of users from the second base station, and average throughputs received by the subset of users from the third base station.

According to at least one example embodiment, the metrics for the subset of users are further based on estimated instantaneous throughputs to be received by the subset of users from the first base station, estimated instantaneous throughputs to be received by the subset of users from the second base station, and estimated instantaneous throughputs to be received by the subset of users from the third base station.

According to at least one example embodiment, a device for multi-streaming data may include a scheduler configured to carry out the above described method.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of example embodiments.

DETAILED DESCRIPTION OF EXAMPLE EMBODIMENTS

Figure 1A:
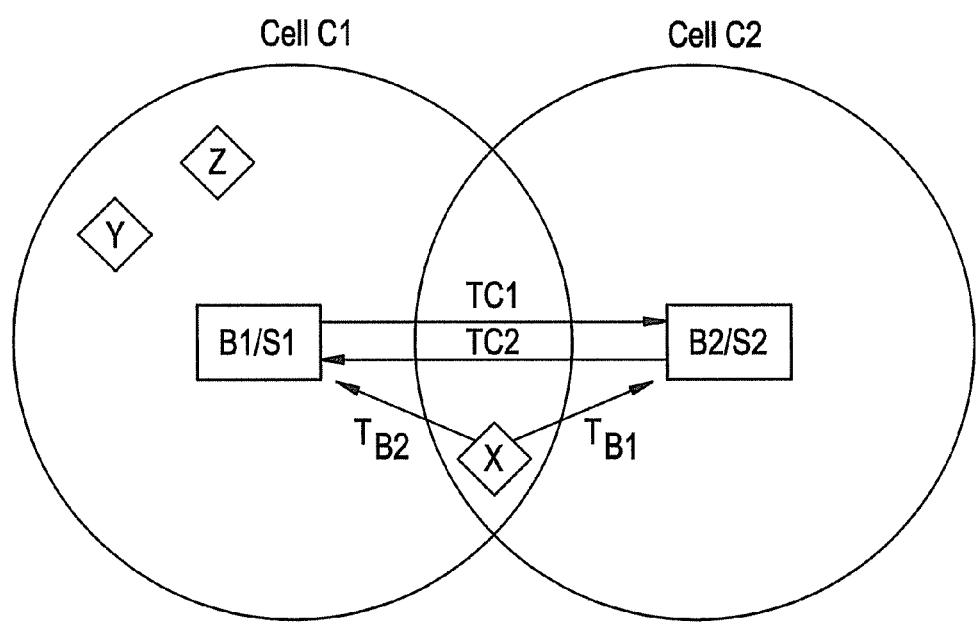
FIGS. 1A and 1B are diagrams illustrating a communications network in which a scheduling algorithm according to at least one example embodiment is carried out.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural foul's as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., base stations, base station controllers, NodeBs, eNodeBs, etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

At least one example embodiment of the application relates to a scheduler and/or a method for scheduling transmission of data to users in a wireless communications network. For convenience of explanation, this description relates to methods and devices used for proportional fair (PF) scheduling algorithms. However, example embodiments are not limited thereto, and could relate to other scheduling algorithms.

In general, it should be understood that scheduling algorithms are well known within the art (see e.g., U.S. patent application Ser. No. 12/455,220 and U.S. patent application Ser. No. 12/455,215, both of which are hereby incorporated by reference in their entirety). Equations 1-5 below describe a well known conventional PF scheduling algorithm employed by a PF scheduler. With reference to Equation 1 below, a conventions PF scheduler calculates a PF metric for each user being served by a particular base station.

$$\Psi_j(t) = T_{inst,j}(t)/T_{avg,j}(t) \qquad [1]$$

In Equation 1, $\Psi_j(t)$ is the PF metric for a user 'j' at a time t, $T_{inst,j}(t)$ is the instantaneous throughput that the user 'j' would receive if served by a base station at time t, and $T_{avg,j}(t)$ is the long-term exponentially averaged throughput that the user 'j' has received from the serving base station.

The user's average throughput $T_{avg,j}(t)$ may be updated via an exponential averaging filter according to Equation 2 below:

$$T_{avg,j}(t)=\beta T_{avg,j}(t-1)+(1-\beta)T_{inst,j}(t) \quad [2]$$

This averaging filter may be an Infinite Impulse Response (IIR) Filter, with a "Forgetting Factor" β that indicates how long the filter should "look back" for the calculation of $T_{avg, j}(t)$. Accordingly, $0 \leq \beta < 1$. $T_{avg, j}(t-1)$ is the long-term exponentially averaged throughput that the user 'j' has received from the serving base station at a time t−1. If the user 'j' is not served at time t, $T_{inst, j}(t)=0$ in Equation 2.

Although not shown, it should be understood that alternate implementations of calculating a PF metric also exist and are within the scope of this application.

When a user 'j' is served by multiple base stations, a conventional PF scheduler at base station Bi may select a user with the highest PF metric $\Psi_{Bi}(t)$ according to Equation 3 below:

$$\Psi_{Bi}(t)=\max\_j\, T_{inst,j,Bi}(t)/T_{agg,j}(t) \quad [3]$$

In Equation 3, max_j indicates a maximization of the function/metric with respect to a user 'j', $T_{inst,j, Bi}(t)$ is the instantaneous throughput that a user 'j' may receive from base station Bi and $T_{agg,j}(t)$ is an aggregate throughput received by user 'j' at time t. $T_{agg,j}(t)$ may be expressed as Equation 4 below:

$$T_{agg,j}(t)=T_{avg,j, Bi}(t)+\Sigma T_{avg,j, Bk}(t) \quad [4]$$

In Equation 4, the term 'Bk' may represent one or more base stations, other than base station Bi. In other words, Bk≠Bi. In Equation 4, $T_{avg,j, Bi}(t)$ is the average throughput that user 'j' has received from base station Bi over a previous period of time, and $\Sigma T_{avg,j, Bk}(t)$ is a sum of average throughputs received by user 'j' from base station(s) Bk. The value of $T_{agg, j}(t)$ is independent of the base station Bi. Rather, $T_{agg,j}(t)$ depends on the user, j, being considered. In Equation 4, user j's average throughput from base station Bi at a time t (i.e., $T_{avg,j, Bi}(t)$) is calculated according to Equation 5 below:

$$T_{avg,j, Bi}(t)=\beta T_{avg,j, Bi}(t-1)+(1-\beta)T_{inst,j, Bi}(t) \quad [5]$$

In Equation 5, $T_{avg,j, Bi}(t-1)$ is the long-term exponentially averaged throughput that user 'j' has received from base station Bi over a previous period of time t−1, and $T_{inst,j, Bi}(t)$ is the estimated instantaneous throughput for user 'j' that is achievable from base station Bi. As in Equation 2, $T_{inst,j, Bi}(t)=0$ if a user is not served by base station Bi. As discussed with reference to Equation 2, β is a "Forgetting Factor", where $0 \leq \beta < 1$.

As one may appreciate from the description of Equations 1-5 above, a conventional PF scheduler does not take into account asymmetries between base stations (e.g., ambient conditions at each base station), which results in system inefficiency and lower gains delivered to the system's users. For example, conventional scheduling algorithms do not take into account whether participating base stations may have different deployments (e.g., small cell or macro cell), radio frequency (RF) loading, operator policies, and/or user load conditions. Accordingly, at least one example embodiment of the application is directed toward scheduling methods and/or devices that take into account the asymmetries between base stations to improve system efficiency and increase throughput to users. The following description outlines at least two schemes that may take into account the aforementioned asymmetries between base stations, identified below as Scheme A and Scheme B.

Scheme A

At least one example embodiment of the application leverages the asymmetries between base stations by modulating the calculation of $T_{agg,j}(t)$ from Equations 3 and 4 based on transmission conditions at each base station. A PF scheduler at base station Bi according to an example embodiment may select a user with a highest PF metric $\Psi_{Bi}(t)$ according to Equation 6 below:

$$\Psi_{Bi}(t)=\max\_j\, T_{inst,j, Bi}(t)/T_{agg,j, Bi}(t) \quad [6]$$

As in the conventional art, max_j indicates a maximization of the function/metric that follows. $T_{inst,j, Bi}(t)$ is the estimated instantaneous throughput to be received by user 'j' if served by base station Bi. $T_{agg, j, Bi}(t)$ is the aggregate throughput received by user j from base station Bi at a particular time t. Unlike the conventional art, however, one example embodiment modulates the calculation of $T_{agg,j, Bi}(t)$ with alpha parameters, as shown in Equation 7 below:

$$T_{agg,j, Bi}(t)=\alpha_{ii}(t)*T_{avg,j, Bi}(t)+\Sigma[\alpha_{ik}(t)*T_{avg,j, Bk}(t)] \quad [7]$$

In Equation 7, term 'Bk' may represent one or more base stations, other than base station Bi. In other words, k≠i. The term $\alpha_{ii}(t)*T_{avg,j, Bi}(t)$ is a weighted average throughput user 'j' has received from base station Bi. The term $\Sigma\alpha_{ik}(t)*T_{avg,j, Bk}(t)$ is a weighted sum of the average throughputs user 'j' has received from base station(s) Bk. The terms $\alpha_{ii}(t)$ and $\alpha_{ik}(t)$ may be referred to as alpha parameters and serve as weighting factors in Equation 7. For example, $\alpha_{ii}(t)$ refers to an alpha parameter at base station Bi which may vary over time t. The term $\alpha_{ii}(t)$ takes into account the effect of base station Bi on its own scheduling. The term $\alpha_{ik}(t)$ refers to an alpha parameter that depends of base station Bi and Bk which may vary over time t. For example, $\alpha_{ik}(t)$ denotes the impact of the base station Bk on the scheduling at base station Bi. Alpha parameters $\alpha_{ii}(t)$ and $\alpha_{ik}(t)$ may be values calculated based on transmission conditions at base stations Bi and Bk. The terms $T_{avg,j, Bi}(t)$ and $T_{avg,j, Bk}(t)$ are calculated as in Equation 5 above using throughput IIR averaging. As in Equation 5, $T_{inst,j, Bi}(t)=0$ if a user 'j' is not served by base station Bi. Equation 7 is similar to Equation 4, except that the terms of Equation 7 are modulated (i.e., weighted) by alpha parameters $\alpha_i(t)$ and $\alpha_{ik}(t)$.

According to at least one example embodiment, alpha parameters $\alpha_{ii}(t)$ and $\alpha_{ik}(t)$ take into account the asymmetries between base stations. For example, $\alpha_{ii}(t)$ may be calculated by the PF scheduler to take into account transmission conditions at base station Bi, and $\alpha_{ik}(t)$ may be calculated by the PF scheduler to take into account the impact of transmission conditions at base station(s) Bk on scheduling at base station Bi. Alpha parameter $\alpha_{ii}(t)$ may be calculated by the PF scheduler of base station Bi based on at least one of a throughput delivered to a user by base station Bi, a load at base station Bi, a signal to noise ratio ensemble for a user with respect to base station Bi, an energy cost per bit for the user with respect to base station Bi, and an operator policy with respect to base station Bi. Alpha parameter $\alpha_{ik}(t)$ may be calculated by the PF scheduler based on at least one of a throughput delivered to a user by base station Bk, a load at base station Bk, a signal to noise ratio ensemble for a user with respect to base station Bk, an energy cost per bit for the user with respect base station Bk, and an operator policy with respect to base station Bk.

A PF scheduler's ability to calculate alpha parameters $\alpha_{ii}(t)$ and $\alpha_{ik}(t)$ is possible because base station(s) Bk shares transmission conditions with base station Bi and vice versa. In other words, the alpha parameters are based on the transmission conditions, which may be exchanged between base stations over an air interface and/or a backhaul. The calculation of alpha parameters $\alpha_{ii}(t)$ and $\alpha_{ik}(t)$ are discussed in more detail below with reference to Examples 1-5.

In Equations 6 and 7 above, estimated instantaneous throughputs for user 'j' that are achievable from base station Bi (i.e., $T_{inst,j,\,Bi}(t)$) are not be shared with other base stations Bk. As one may appreciate from the description of Equations 6 and 7, Scheme A introduces alpha parameters into the denominator of the PF equation (Equation 6) based on the exchange of transmission conditions. Accordingly, global operating conditions are incorporated into the PF metric, rather than doing the determination just on the basis of the conditions known locally.

Scheme B

At least one other example embodiment leverages the asymmetries between base stations by modulating the calculation of $T_{agg,j}(t)$ and sharing estimated instantaneous throughputs of a base station Bi (i.e., a serving base station) with other base stations Bk. Scheme B permits the system to respond to instantaneous user channel conditions. As a result, Scheme B offers a faster adaptation of the system to traffic dynamics (e.g., changes in user population in a cell due to user motion, and/or changes in data bits remaining to deliver).

In Scheme B, a PF scheduler according to an example embodiment selects the user with the highest PF metric according to Equation 8 below:

$$\Psi_{Bi}(t) = \max\_j\, D_{j,\,Bi}(t)/T_{avg,j}(t) \qquad [8]$$

In Equation 8, $\Psi_{Bi}(t)$ is the PF metric at a base station Bi for particular time t, and $D_{j,\,Bi}(t)$ may be expressed as shown in Equation 9 below:

$$D_{j,Bi}(t) = \alpha_{ii}(t)*T_{inst,j,\,Bi}(t) + \Sigma[\alpha_{ik}(t)*T_{inst,j,\,Bk}(t)] \qquad [9]$$

In Equation 9, alpha parameters $\alpha_{ii}(t)$ and $\alpha_{ik}(t)$ take into account the asymmetries between base stations in a manner the same as or similar to that discussed above with respect to Equation 7. In Equation 9, $T_{inst,j,\,Bi}(t)$ is the estimated instantaneous throughput to be received by the user 'j' from base station Bi if user 'j' is selected by the PF scheduler of base station Bi to receive data. $T_{inst,j,\,Bk}(t)$ is the estimated instantaneous throughput to be received by user 'j' from base station(s) Bk if user 'j' is selected by the PF scheduler of base station Bk to receive data. In Equation 9, Bk≠Bi.

$T_{avg,j}(t)$ from Equation 8 may be expressed as Equation 10:

$$T_{avg,j}(t) = \beta T_{avg,j}(t-1) + (1-\beta) T_{total\text{-}inst,j}(t) \qquad [10]$$

In Equation 10, the actual instantaneous throughputs $T_{total\text{-}inst,j}(t)$ (instead of estimated) may be used if user 'j' has been selected to receive data from one or more of the base stations Bi and/or Bk. In Equation 10, $T_{total\text{-}inst,j}(t)$ may be expressed as Equation 11:

$$T_{total\text{-}inst,j}(t) = T_{inst,j,\,Bi}(t) + \Sigma T_{inst,j,\,Bk}(t) \qquad [11]$$

In Equation 11, $T_{inst,j,\,Bi}(t)$ is the estimated instantaneous throughput that user j may receive from base station Bi at a time t, and $\Sigma T_{inst,j\,Bk}(t)$ is a sum of estimated instantaneous throughputs that user j may receive from base stations Bk, other than base station Bi. In other words, k≠i.

In Equations 8-11, $T_{avg,j,\,Bi}(t)$ for a given user 'j' may be the same at all base stations, i.e., equal to $T_{avg,j}(t)$. Further, as before, $T_{inst,j,\,Bi}(t)=0$ in Equation 11 if a user 'j' is not served by base station Bi at time t. As one may appreciate from the description of Equations 8-11, Scheme B involves scaling the numerator of the PF equation (Equation 8) by taking into consideration the global operating conditions of the network.

Figure 1B:
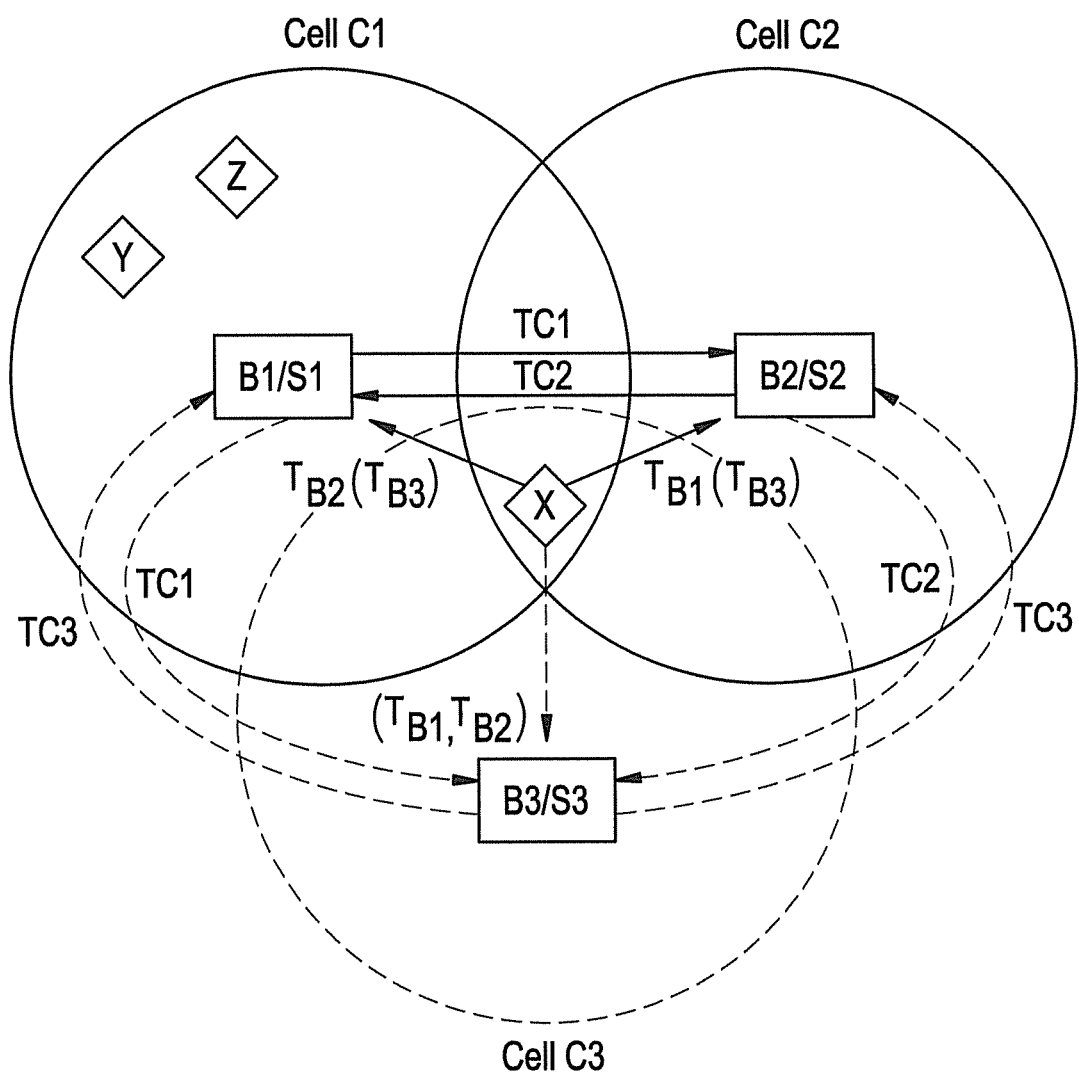

FIGS. 1A and 1B are diagrams illustrating a communications network in which the scheduling algorithms according to at least one example embodiment (i.e., Schemes A and B) are carried out. The communications network in FIGS. 1A and 1B may be in a multi-streaming configuration.

FIG. 1A shows a first cell C1 that has a first base station B1 and a second cell C2 that has a second base station B2. In FIG. 1, users y and z are associated with the first base station B1, and user x is associated with the first base station B1 and the second base station B2. In other words, user x may be served by base stations B1 and B2 simultaneously because user x is encompassed by both cells C1 and C2. FIG. 1 further shows that user x receives data at a throughput $T_{B1}$ (i.e., first data rate) from base station B1, and at a throughput $T_{B2}$ (i.e., second data rate) from base station B2. It should be understood that either of C1 or C2 may be a macro cell and/or a small cell (e.g., a femto cell) in a multi-streaming communications network.

As also shown in FIG. 1A, base stations B1 and B2 exchange information about transmission conditions at each base station. For example, base station B1 sends information about its transmission conditions TC1 with user x to base station B2, and base station B2 sends information about its transmission conditions TC2 with user x to base station B1. Although only one user (i.e., user x) is shown as being served by both base stations B1 and B2, it should be understood that multiple users may be served by both base stations B1 and B2. In this case, base stations B1 and B2 exchange transmission conditions for each user that is being served by both base stations. It should also be understood that transmission conditions TC1 and TC2 may be generated at base stations B1 and B2, respectively. Alternatively, transmission conditions TC1 and TC2 may be generated by an element(s) separate from base stations B1 and B2 (e.g., a central scheduler).

Further, it should be understood that each of transmission conditions TC1 and TC2 may be a set of values. For example, transmission conditions TC1 may include a set of values, one or more values in the set being associated with each user served by base station B1. Similarly, transmission conditions TC2 may include a set of values, one or more values in the set being associated with each user served by base station B2.

FIG. 1A further shows that cell C1 includes a scheduler S1 which may calculate metrics (e.g., PF metrics) for the users being served by base station B1 (e.g., users x, y, and z) based on transmission conditions TC1 and TC2. Cell C2 includes a scheduler S2 which may calculate metrics (e.g., PF metrics) for the users being served by base station B2 based on transmission conditions TC1 and TC2. As shown in FIG. 1A, schedulers S1 and S2 may be integrated into base stations B1 and B2, respectively. Alternatively, schedulers S1 and S2 may be implemented as an element(s) separate from base stations B1 and B2 by, for example, a central scheduler.

Still referring to FIG. 1A, schedulers S1 and S2 may calculate metrics based transmission conditions TC1 and TC2 and downlink throughputs $T_{B1}$ and $T_{B2}$. It should be understood that throughputs $T_{B1}$ and $T_{B2}$ may represent average throughputs (i.e., throughputs already received by user x) and/or estimated throughputs (i.e., throughputs to be received by user x). For example, $T_{B1}$ may represent average throughputs already received by user x from base station B1, and/or estimated throughputs to be received by user x from base station B1. Similarly, $T_{B2}$ may represent average throughputs already received by user x from base station B2, and/or estimated throughputs to be received by user x from base station B2. In a case where $T_{B1}$ and $T_{B2}$ represent estimated throughputs, $T_{B1}$ may already be known by scheduler S1 and user x may inform scheduler S1 of estimated throughput $T_{B2}$. Similarly, estimated throughput $T_{B2}$ may already be known by scheduler S2 and user x may inform scheduler S2 of estimated throughput $T_{B1}$. User x may 'inform' a scheduler of an estimated throughput by providing channel quality information (CQI) from which estimated throughputs may be calculated (e.g., $T_{B1}=\log(1+CQI_x)$) by the scheduler. Although the user x is shown as informing the scheduler S1 of the throughput $T_{B2}$, example embodiments are not limited thereto. For example, the scheduler S1 may receive the throughput $T_{B2}$ from, for example, the second base station B2.

FIG. 1B shows the presence of a possible third cell C3 having a third base station B3 and a third scheduler S3. The inclusion of another base station (i.e., B3) that also serves user x means that scheduler S1 takes into account transmission conditions TC2 and TC3 and/or throughputs $T_{B2}$ and $T_{B3}$ (average and/or estimated) for user x when calculating the PF metric for user x. Although not shown in FIG. 1B, it should be understood that the communications network may include additional cells and base stations that also serve user x. These additional cells and base stations have transmission conditions and/or throughputs that may be taken into account at each scheduler in the network.

Various implementations of Scheme A will now be described below with reference to Examples 1-4 and scheduler S1 from FIG. 1.

Example 1

With reference to the multi-streaming environment of FIG. 1A, user x may be served by both base stations B1 and B2. Referring to Equation 7, substitute base station B1 for base station Bi and base station B2 for base station Bk. In Scheme A and Equation 7 discussed above, it would be useful for scheduler S1 to set alpha parameters as follows: $\alpha_{11}=\alpha_{12}=\infty$ (i.e. arbitrary large values), and arbitrary finite values for $\alpha_{21}$ and $\alpha_{22}$. The term $\alpha_{11}$ takes into account the impact of base station B1 on its own scheduling, and $\alpha_{12}$ takes into account the impact of base station B2 on the scheduling at base station B1. The term $\alpha_{21}$ takes into account the impact of base station B1 on scheduling at base station B2, and $\alpha_{22}$ takes into account the impact of base station B2 on its own scheduling. These alpha parameter definitions apply throughout Examples 1-5. Setting alpha parameters as in Example 1 will result in off-loading user x to serving base station B2 so that base station B1 is freed up to serve users y and z, and base station B2 serves user x.

Example 2

Example 2 may be a generalized version of Example 1. Referring to FIG. 1A and Equation 7, substitute base station B1 for base station Bi and base station B2 for base station Bk. Referring to FIG. 1A, assume user x which has a signal to interference noise ratio (SINR) γ1 with respect to base station B1 and SINR γ2 with respect to base station B2. Suppose that γ1>γ2, but a number of users 'n1' at base station B1 is much greater than a number of users 'n2' at base station B2 (i.e., n1>>n2). Here, the system may offload user x to base station B2 even though user x has a better SINR from base station B1. This is because user x is offered scheduling cycles more often by base station B2 as a result of base station B2's lighter user population. Under Scheme A, alpha parameters in Equation 7 may be set as follows: $\alpha_{11}=(n1)^p/\gamma 1$, $\alpha_{22}=(n2)^p/\gamma 2$, $p>=1$, and $\alpha_{12}=\alpha_{21}=1$.

Example 3

Example 3 is an example of an asymmetric user population in two neighboring cells, but with equal SINR from both cells. In Example 3, assume that base stations B1 and B2 from FIG. 1 share only the user population information with each other. Since base stations B1 and B2 are aware of the user population asymmetries between each other, alpha parameters within Scheme A and Equation 7 may be: $\alpha_{11}=[(n1-n2)^p]^+$, $\alpha_{22}=[(n2-n1)^p]^+$, $p>=1$, odd p, and $\alpha_{12}=\alpha_{21}=1$. In Example 3, a user will be served by the more lightly loaded base station ($[x]^+$ is the non-negative portion of x. i.e., $[x]^+=x$ if $x>0$, $[x]^+=0$ if $x<=0$).

Example 4

Example 4 relates to a het-net deployment scenario, where a user x is being served by a small cell and a macro cell in a multi-streaming configuration. Here, the energy cost per bit delivered through small cell may be less than the energy cost per bit consumed by the neighboring macro-cell. In Example 4, a base station of the small cell and a base station of the macro cell exchange the energy cost per bit information and use it as follows.

In Example 4, assume 'E1' is energy cost per bit from the small cell and 'E2' is energy cost per bit from the macro cell. In this example, the alpha parameters under Scheme A and Equation 7 may be: $\alpha_{11}=1$, $\alpha_{12}=E1/E2(<1)$, $\alpha_{22}=E2/E1(>1)$, $\alpha_{21}=1$. In this way, the PF metric for the user x in the small cell will be boosted whereas the PF metric for user x in the macro cell will be attenuated. Accordingly, the user may be scheduled to be served by the small cell, which improves the energy cost per bit along with the throughput. In this way, it should be understood that alpha parameters may be considered as 'weighting factors' for Equations 7 and 9 above.

An implementation of Scheme B will now be described below with reference to Example 5.

Example 5

With reference to FIG. 1A, base stations B1 and B2 may share information about user population, as well as the channel quality information from a base station with respect to user x. In Example 5, the alpha parameters under Scheme B and Equation 9 may be: $\alpha_{11}=PF_1^P$, $\alpha_{22}=PF_2^P$, $P\geq 1$ and $\alpha_{12}=\alpha_{21}=1$. Here, the PF metric takes into account the SINRs $\gamma_i$, average throughputs $T_{avg}(t)$ served at each base station, and the cell populations $n_i$ for prioritizing users.

Figure 2:
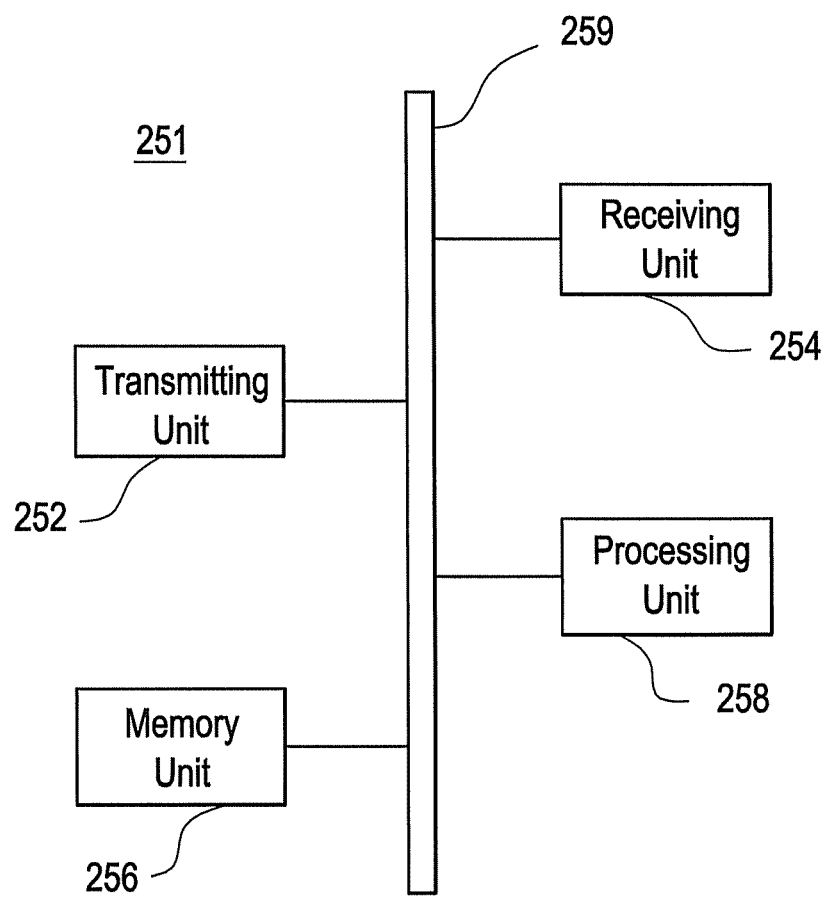
FIG. 2 is a diagram illustrating an example structure of a scheduler according to at least one example embodiment.

FIG. 2 is a diagram illustrating an example structure of scheduler according to an example embodiment. For example, schedulers S1, S2, and/or S3 from FIGS. 1A and 1B may have the structure described below with reference to FIG. 2.

In FIG. 2, a scheduler 251 may be configured for use in the communications network of FIG. 1 (e.g., a multi-streaming communications network). As shown in FIGS. 1A and 1B, it should be understood that the scheduler 251 may be embodied in, for example, a base station (e.g., base stations B1 or B2) of a wireless communications network. Referring to FIG. 2, the scheduler 251 may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259. The transmitting unit 252 is a device that includes hardware and any necessary software for transmitting wireless signals including, for example, data signals, control signals, and signal strength/quality information via one or more wireless connections to other network elements in a communications network.

The receiving unit 254 is a device that includes hardware and any necessary software for receiving wireless signals including, for example, data signals, control signals, and signal strength/quality information via one or more wireless connections to other network elements in a communications network. The transmitting unit 252 and the receiving unit 254 may employ any well-known multi-streaming architecture.

The memory unit 256 may be any device capable of storing data including magnetic storage, flash storage, etc.

The processing unit 258 may be any device capable of processing data including, for example, a microprocessor configured to carry out specific operations based on input data, or capable of executing instructions included in computer readable code. For example, it should be understood that the modifications and methods described below may be stored on the memory unit 256 and implemented by the processing unit 258 within scheduler 251.

Further, it should be understood that the below modifications and methods may be carried out by one or more of the above described elements of the scheduler 251. For example, the receiving unit 254 may carry out steps of "receiving," "acquiring," "obtaining," and the like; transmitting unit 252 may carry out steps of "transmitting," "outputting," and the like; processing unit 258 may carry out steps of "determining," "generating", "correlating," "calculating," and the like; and memory unit 256 may carry out steps of "storing," "saving," and the like.

Figure 3A:
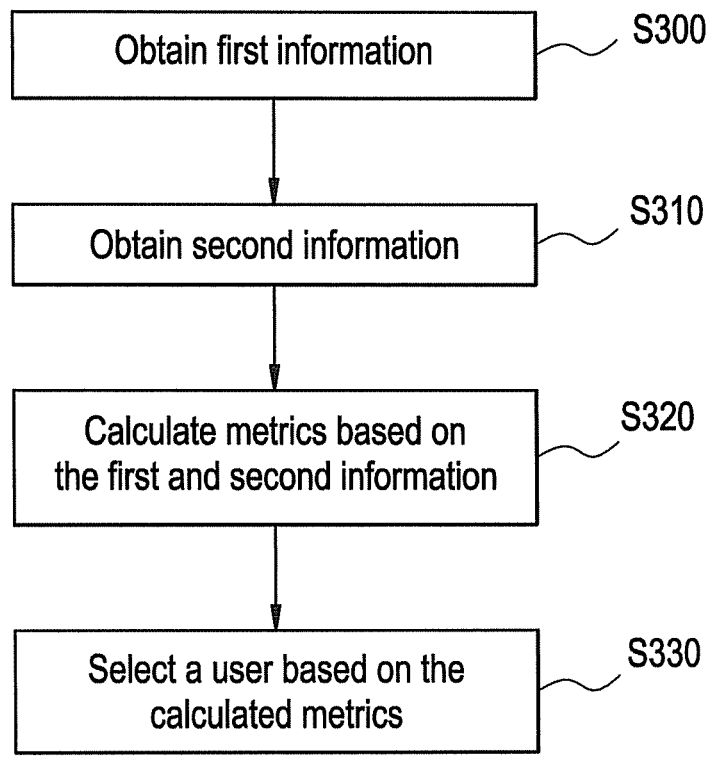
FIGS. 3A and 3B are flow charts illustrating example operations performed by the scheduler of FIG. 2 according to at least one example embodiment.
Figure 3B:
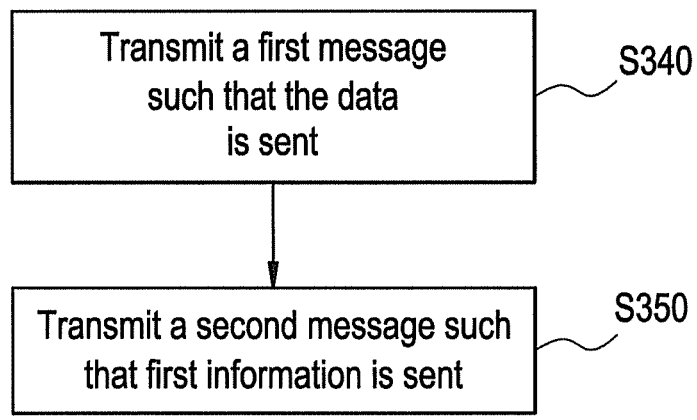

FIGS. 3A and 3B are flow charts illustrating example operations performed by a scheduler, according to at least one example embodiment. For example, the steps described in FIGS. 3A and 3B may be performed by a scheduler S1 (which corresponds to scheduler 251 in FIG. 2) of the first base station B1 in FIG. 1. Accordingly, FIGS. 3A and 3B are discussed with reference to FIGS. 1A and 1B.

In step S300 of FIG. 3, the scheduler S1 obtains first information. The first information may be based on transmission conditions TC1 between a first base station B1 and a first set of users (e.g., users x, y, z) associated with the first base station B1. For example, the first information may be at least one of a throughput delivered to the first set of users by the first base station B1, a load at the first base station B1, a signal to noise ratio ensemble (i.e., a collection of signal to noise ratios) for the first set of users with respect to the first base station B1, an energy cost per bit for the first set of users with respect to the first base station B1, and an operator policy with respect to the first base station B1.

In step S300, the scheduler S1 may obtain the first information by generating the first information if, for example, the scheduler S1 is embodied in the first base station B1. Alternatively, the scheduler S1 may obtain the first information by receiving the first information from the base station B1 if, for example, the scheduler S1 is embodied in an element separate from the base station B1.

In step S310, the scheduler S1 obtains second information. The second information may be based on transmission conditions TC2 between a second base station B2 and a second set of users (e.g., user x) associated with the second base station B2. The scheduler S1 may obtain the second information from base station B2. The second information may be at least one of a throughput delivered to the second set of users by the second base station B2, a load at the second base station B2, a signal to noise ratio ensemble for the second set of users with respect to the second base station B2, an energy cost per bit for the second set of users with respect to the second base station B2, and an operator policy with respect to the second base station B2.

In step S320, the scheduler S1 calculates metrics for the first set of users (e.g., users x, y, z) based on the first and second information. For example, the first and second information may be used to calculate the alpha parameters described in Equations 7 and 9 above. The first set of users may include a shared subset of users that are associated with the first and second base stations. In the example shown in FIG. 1, this shared subset of users is defined by user x because user x may be served by both base stations B1 and B2. The metrics calculated by scheduler S1 may be, for example, PF metrics for a PF scheduling algorithm. For example, the scheduler S1 calculates the alpha parameters from Equations 7 and 9 using the first and second information, and then calculates each user's PF metric using the alpha parameters. In step S320, the scheduler S1 may be configured to calculate the metrics for the shared subset of users based on additional factors.

For example, in accordance with Scheme A of the application, the scheduler S1 may be configured to calculate the metrics for the shared subset of users based on the first and second information from steps S300 and S310, average throughputs received by the shared subset of users from the first base station B1, and average throughputs received by the shared subset of users from the second base station B2 (see Equation 7 above). As another example, in accordance with Scheme B of the application, the scheduler S1 may be configured to calculate the metrics for the shared subset of users based on the first and second information from steps S300 and S310, estimated instantaneous throughputs to be received by the shared subset of users from the first base station B1, and estimated instantaneous throughputs to be received by the shared subset of users from the second base station B2 (see Equation 9 above).

In step S330, the scheduler S1 selects a user from among the first set of users based on the calculated metrics. For example, the scheduler S1 may select the user from the first set of users having a largest calculated metric in accordance with Equations 6 and/or 8.

Although not shown in FIGS. 3A and 3B, it should be understood that in addition to or conjunction with steps S320 and S330, the scheduler S1 may be further configured to obtain third information. The third information may be transmission conditions TC3 between a third base station B3 and a third set of users (see, e.g., FIG. 1B). For example, the third information may be based on at least one of a throughput delivered to the third set of users by the third base station, a load at the third base station, a signal to noise ratio ensemble for the third set of users with respect to the third base station, an energy cost per bit for the third set of users with respect to the third base station, and an operator policy with respect to the third base station. In this case, at least one user in the shared subset of users may also be associated with the third base station (i.e., user x in FIG. 1B). Then, the scheduler S1 may calculate metrics for the first set of users based on the first, second, and third information. The metrics calculated by scheduler S1 may be, for example, PF metrics for a PF scheduling algorithm. For example, the scheduler S1 calculates the alpha parameters from Equations 7 and 9 using the first, second, and third information, and then calculates each user's PF metric using the alpha parameters. With the presence of a third base station B3, the scheduler S1 may be configured to calculate metrics for the shared subset of users based on additional factors.

For example, in accordance with Scheme A of the application, the scheduler S1 may be configured to calculate the metrics for the shared subset of users based on the first, second, and third information, average throughputs received by the shared subset of users from the first base station B1, average throughputs received by the shared subset of users from the second base station B2, and average throughputs received by the shared subset of users from the third base station B3. As another example, in accordance with Scheme B of the application, the scheduler S1 may be configured to calculate the metrics for the shared subset of users based on the first, second, and third information, estimated instantaneous throughputs to be received by the shared subset of users from the first base station B1, estimated instantaneous throughputs to be received by the shared subset of users from the second base station B2, and estimated instantaneous throughputs to be received by the shared subset of users from the third base station B3.

Referring to FIG. 3B, in step S340, the scheduler S1 may transmit a first message such that the data (i.e., the data being multi-streamed to the users) is sent to the selected user from step S330. For example, the scheduler S1 may transmit the first message such that the base station B1 sends the data to the selected user.

In step S350, the scheduler S1 transmits a second message such that the first information is sent to the second base station B2. For example, the scheduler S1 transmits the second message such that the first base station B1 sends the first information to the scheduler S2 of the second base station. The scheduler S1 may transmit the second message such that the first information is sent to the second base station at a desired time period, for example, at desired intervals and/or upon a request from the second base station. The first information may be sent to the second base station B2 via at least one of a backhaul and an air interface. The scheduler S2 at base station B2 may use the received first information in a scheduling algorithm for the users associated with base station B2 (i.e., the second set of users). The scheduling algorithm for scheduler S2 is the same as or similar to the scheduling algorithm employed by scheduler S1 as described above. Accordingly, a description of the operations for scheduler S2 has been omitted for the sake of brevity.

Methods and devices for scheduling according to at least one example embodiment may provide improvements in resource utilization (e.g. intermittent and bursty data traffic as in the case of web browsing), load balancing between neighboring cells (in the short and the long time scales), and/or balancing energy costs per bit (small cells vs. macro cells). Thus, methods and devices according to at least one example embodiment may improve network efficiency and increase gains delivered to the network's users.

Example embodiments described above need not be restricted only to asymmetric deployments. For example, the above described schemes may be used in symmetric deployments, for instance, to implement different grades of Quality of Service (QoS) to different users, or specific operator policies.

Variations of the example embodiments are not to be regarded as a departure from the spirit and scope of the inventive concepts disclosed herein. All such variations as would be apparent to one skilled in the art are intended to be included within the scope of this disclosure.

What is claimed is:

1. A method of multi-streaming data, comprising:
obtaining, at a scheduling device, first information based on transmission conditions between a first base station and a first set of users associated with the first base station;
obtaining, at the scheduling device, second information based on transmission conditions between a second base station and a second set of users associated with the second base station;
calculating, at the scheduling device, metrics for the first set of users based on the first and second information, the first set users including a subset of users that are associated with the first and second base station, the first and second information including parameters that i) indicate an impact of the transmission conditions between the first base station and the first set of users on scheduling at the second base station, and ii) indicate an impact of the transmission conditions between the second base station and the second set of users on scheduling at the first base station;
selecting a user from among the first set of users based on the calculated metrics; and
transmitting a first message such that the data is sent from the first base station to the selected user.

2. The method of claim 1, further comprising:
transmitting a second message such that the first information is sent to the second base station.

3. The method of claim 2, wherein the first information is sent to the second base station via at least one of a backhaul and an air interface.

4. The method of claim 1, wherein the selecting the user includes selecting the user having a largest one of the calculated metrics.

5. The method of claim 1, wherein the calculating the metrics includes calculating the metrics for the subset of users based on the first and second information, average throughputs received by the subset of users from the first base station, and average throughputs received by the subset of users from the second base station.

6. The method of claim 1, wherein the calculating the metrics includes calculating the metrics for the subset of users based on the first and second information, estimates of instantaneous throughputs to be received by the subset of users from the first base station, and estimates of instantaneous throughputs to be received by the subset of users from the second base station.

7. The method of claim 1, wherein,
the first information is at least one of a throughput delivered to the first set of users by the first base station, a load at the first base station, a signal to noise ratio ensemble for the first set of users with respect to the first base station, an energy cost per bit for the first set of users with respect to the first base station, and an operator policy with respect to the first base station, and
the second information is at least one of a throughput delivered to the second set of users by the second base station, a load at the second base station, a signal to noise ratio ensemble for the second set of users with respect to the second base station, an energy cost per bit for the second set of users with respect to the second base station, and an operator policy with respect to the second base station.

8. The method of claim 1, further comprising:
obtaining third information based on transmission conditions between a third base station and a third set of users associated with the third base station, wherein,
at least one user in the subset is also associated with the third base station, and
the calculating the metrics for the first set of users includes calculating the metrics based on the first, second, and third information.

9. The method of claim 8, wherein the metrics for the subset of users are further based on average throughputs received by the subset of users from the first base station, average throughputs received by the subset of users from the second base station, and average throughputs received by the subset of users from the third base station.

10. The method of claim 8, wherein the metrics for the subset of users are further based on estimates of instantaneous throughputs to be received by the subset of users from the first base station, estimates of instantaneous throughputs to be received by the subset of users from the second base station, and estimated instantaneous throughputs to be received by the subset of users from the third base station.

11. A device for multi-streaming data, comprising:
a scheduler including,
    a receiver configured to,
        obtain first information based on transmission conditions between a first base station and a first set of users associated with the first base station, and
        obtain second information based on transmission conditions between a second base station and a second set of users associated with the second base station,
    a processor configured to,
        calculate metrics for the first set of users based on the first and second information, the first set users including a subset of users that are associated with the first and second base station, the first and second information including parameters that i) indicate an impact of the transmission conditions between the first base station and the first set of users on scheduling at the second base station, and ii) indicate an impact of the transmission conditions between the second base station and the second set of users on scheduling at the first base station, and
        select a user from among the first set of users based on the calculated metrics; and
    a transmitter configured to transmit a first message such that the data is sent from the first base station to the selected user.

12. The device of claim 11, wherein the transmitter is configured to:
transmit a second message such that the first information is sent to the second base station.

13. The device of claim 12, wherein the first information is sent to the second base station via at least one of a backhaul and an air interface.

14. The device of claim 11, wherein the processor is configured to select the user having a largest calculated metric.

15. The device of claim 11, wherein the processor is configured calculate the metrics for the subset of users based on the first and second information, average throughputs received by the subset of users from the first base station, and average throughputs received by the subset of users from the second base station.

16. The device of claim 11, wherein the processor is configured to calculate the metrics for the subset of users based on the first and second information, estimates of instantaneous throughputs to be received by the subset of users from the first base station, and estimates of instantaneous throughputs to be received by the subset of users from the second base station.

17. The device of claim 11, wherein,
the first information is at least one of a throughput delivered to the first set of users by the first base station, a load at the first base station, a signal to noise ratio ensemble for the first set of users with respect to the first base station, an energy cost per bit for the first set of users with respect to the first base station, and an operator policy with respect to the first base station, and
the second information is at least one of a throughput delivered to the second set of users by the second base station, a load at the second base station, a signal to noise ratio ensemble for the second set of users with respect to the second base station, an energy cost per bit for the second set of users with respect to the second base station, and an operator policy with respect to the second base station.

18. The device of claim 11, wherein the receiver is configured to obtain third information based on transmission conditions between a third base station and a third set of users associated with the third base station, at least one user in the subset being also associated with the third base station, and the processor is configured to calculate the metrics for the first set of users includes based on the first, second, and third information.

19. The device of claim 18, wherein the metrics for the subset of users are further based on average throughputs received by the subset of users from the first base station, average throughputs received by the subset of users from the second base station, and average throughputs received by the subset of users from the third base station.

20. The device of claim 8, wherein the metrics for the subset of users are further based on estimates of instantaneous throughputs to be received by the subset of users from the first base station, estimated instantaneous throughputs to be received by the subset of users from the second base station, and estimates of instantaneous throughputs to be received by the subset of users from the third base station.

* * * * *